US012713123B2

(12) United States Patent
Tokita

(10) Patent No.: US 12,713,123 B2
(45) Date of Patent: Aug. 18, 2026

(54) IMAGING APPARATUS, IMAGING METHOD, AND NON-TRANSITORY COMPUTER-READABLE MEDIUM HAVING PROGRAM

(71) Applicant: JVCKENWOOD Corporation, Yokohama (JP)

(72) Inventor: Shigetoshi Tokita, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 0 days.

(21) Appl. No.: 19/008,706

(22) Filed: Jan. 3, 2025

(65) Prior Publication Data

US 2025/0142198 A1 May 1, 2025

Related U.S. Application Data

(63) Continuation of application No. PCT/JP2023/033419, filed on Sep. 13, 2023.

(30) Foreign Application Priority Data

Sep. 16, 2022 (JP) ................................ 2022-148085
Sep. 16, 2022 (JP) ................................ 2022-148086

(51) Int. Cl.
*H04N 23/61* (2023.01)
*H04N 23/69* (2023.01)
*H04N 23/695* (2023.01)

(52) U.S. Cl.
CPC ............. *H04N 23/61* (2023.01); *H04N 23/69* (2023.01); *H04N 23/695* (2023.01)

(58) Field of Classification Search
None
See application file for complete search history.

(56) References Cited

U.S. PATENT DOCUMENTS 6,982,755 B1 * 1/2006 Kikuzawa .............. H04N 23/69 348/E5.079
2023/0115596 A1 * 4/2023 D'Acquisto ........... G03B 17/02 348/143
2024/0015386 A1 * 1/2024 Dalati .................... G06V 10/70

FOREIGN PATENT DOCUMENTS

JP 2020-156400 A 10/2020

OTHER PUBLICATIONS

International Search Report for the corresponding PCT Application No. PCT/JP2023/033419 mailed Dec. 5, 2023, 4 pages.
International Preliminary Examination Report on Patentability (I) for the corresponding PCT Application No. PCT/JP2023/033419 mailed Mar. 1, 2025, 8 pages.

(Continued)

*Primary Examiner* — Eileen M Adams
(74) *Attorney, Agent, or Firm* — Shih IP Law Group, PLLC

(57) ABSTRACT

A pan-tilt drive unit executes at least one of a pan operation or a tilt operation of the imaging unit. A drive control unit controls the pan-tilt drive unit. A detection unit detects an animal in a video shot by the imaging unit. A determination unit determines whether the animal detected by the detection unit is alert to the imaging apparatus. When the determination unit determines that the animal is alert to the imaging apparatus while the pan-tilt drive unit is executing a pan operation or a tilt operation in accordance with a movement of the animal, the drive control unit suspends the pan operation or the tilt operation executed by the pan-tilt drive unit.

5 Claims, 11 Drawing Sheets

(56) References Cited

OTHER PUBLICATIONS

Jinchao Zhu, et al., "Smart Survelillance: a Nature Ecological Intelligent Surveillance System with Robotic Observation Cameras and Environment Factors Sensors" Proceedings of 2018 IEEE 8th Annual International Conference on Cyber Technology in Automation, Control, and Intelligent Systems Jul. 19-23, 2018, Tianjin, China, 6 pages.

Extended European Search Report from EP Application No. 23865572.4 mailed Nov. 14, 2025, 10 pages.

* cited by examiner

IMAGING APPARATUS, IMAGING METHOD, AND NON-TRANSITORY COMPUTER-READABLE MEDIUM HAVING PROGRAM

CROSS REFERENCE TO RELATED APPLICATION

This application is a continuation of application No. PCT/JP2023/033419, filed on Sep. 13, 2023, and claims the benefit of priority from the prior Japanese Patent Application No. 2022-148085, filed on Sep. 16, 2022, and Japanese Patent Application No. 2022-148086, filed on Sep. 16, 2022, the entire contents of which are incorporated herein by reference.

BACKGROUND

1. Field

The present invention relates to an imaging apparatus, an imaging method, and a program for imaging an animal.

2. Description of the Related Art

For the purpose of ecological survey and research of wild animals, an animal may be detected in a video shot by a camera, and the animal may be imaged while changing the shooting direction by driving the pan-tilt table according to the movement of the detected animal. Further, animals may be imaged with an infrared camera for the purpose of ecological survey and research of wild animals. In infrared cameras, it is necessary to execute a calibration process of the infrared sensor to maintain image quality. A method of closing the shutter and imaging the backside uniform-temperature surface of the shutter to calibrate the infrared sensor is known as a calibration processing method for the infrared sensor. This calibration method requires closing the shutter periodically or irregularly.

Patent Literature 1 discloses an apparatus for detecting and imaging wild animals.

[Patent Literature 1] JP2020-156400

Since the pan-tilt table is driven by a motor, the animal may notice the driving sound of the motor during a pan operation or a tilt operation and become alarmed. Also, the shutter is driven by a motor, and so an operating noise is generated. Animals may notice the operating sound and become alarmed.

SUMMARY

An imaging apparatus according to an embodiment includes: an imaging unit; a detection unit that detects an animal in a video shot by the imaging unit; and a determination unit that determines whether the animal detected by the detection unit is alert to the imaging apparatus. The determination unit causes an operation that generates an operating sound to be suspended when the determination unit determines that the animal is alert to the imaging apparatus.

Another embodiment relates to an imaging method. The method includes: detecting an animal in a video shot by an imaging unit; determining whether a detected animal is alert to the imaging apparatus; and causing an operation that generates an operating sound to be suspended when it is determined that the animal is alert to the imaging apparatus.

Optional combinations of the aforementioned constituting elements, and implementations of the embodiments in the form of methods, apparatuses, systems, recording mediums, and computer programs may also be practiced as modes of the embodiments.

BRIEF DESCRIPTION OF THE DRAWINGS

The disclosure will be described with reference to the following drawings.

DETAILED DESCRIPTION

The invention will now be described by reference to the preferred embodiments. This does not intend to limit the scope of the present invention, but to exemplify the invention.

Embodiment 1

Figure 1:
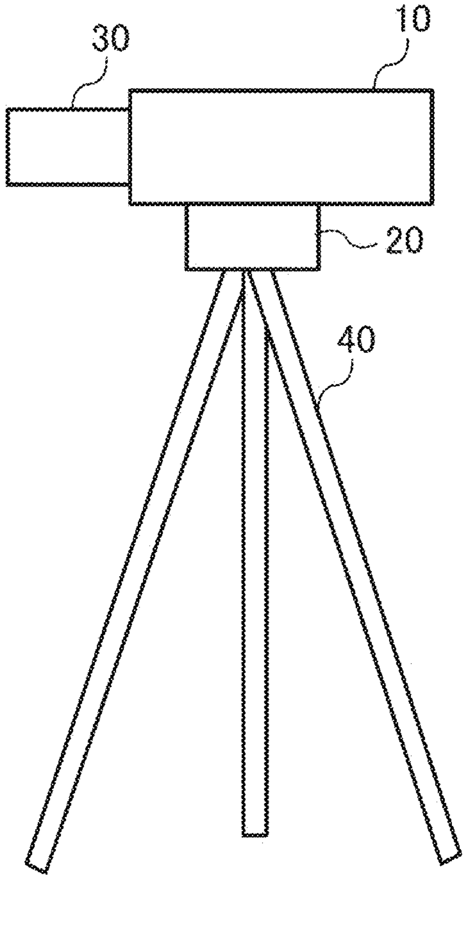
FIG. 1 shows an exemplary configuration of an imaging apparatus according to embodiment 1.

FIG. 1 shows an exemplary configuration of an imaging apparatus 1 according to embodiment 1. In the example shown in FIG. 1, a pan-tilt table 20 is attached to a tripod 40 stand, and an imaging unit 10 is fixed on the pan-tilt table 20. The pan-tilt table 20 has an electric motor and can pan the fixed imaging unit 10 by rotating in the horizontal direction. Further, the pan-tilt table 20 can tilt the fixed imaging unit 10 by rotating in a range of 180° in the vertical direction. A lens unit 30 is attached to the imaging unit 10.

Figure 2:
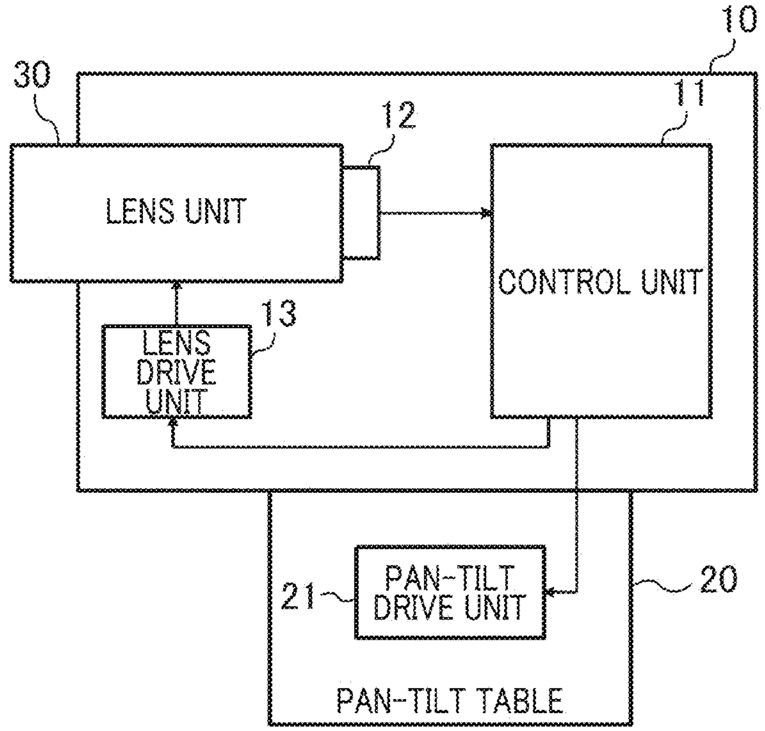
FIG. 2 shows a specific configuration of the imaging unit and the pan-tilt table according to embodiment 1.

FIG. 2 shows a specific configuration of the imaging unit 10 and the pan-tilt table 20 according to embodiment 1. The pan-tilt table 20 includes a stepping motor or a servo motor (not shown) for rotating the pan-tilt table 20 in the horizontal direction, a stepping motor or a servo motor (not shown) for rotating the pan-tilt table 20 in the vertical direction, and a pan-tilt drive unit 21 for driving each of the motor for the horizontal direction and the motor for the vertical direction. The pan-tilt drive unit 21 controls the current induced in each of the motor for the horizontal direction and the motor for the vertical direction based on a control signal supplied from a control unit 11 of the imaging unit 10 to control the movement/stop position in the pan direction and the movement/stop position in the tilt direction of the pan-tilt table 20. That is, the pan-tilt drive unit 21 executes at least one of a pan operation or a tilt operation of the imaging unit 10.

The imaging unit 10 includes a control unit 11, an imaging sensor 12, and a lens drive unit 13. The imaging unit 10 may be any of a visible light camera, a near-infrared camera, or a far-infrared camera. Hereinafter, a visible light camera is taken as an example in embodiment 1. The lens unit 30 has a variable zoom lens that switches the focal length of the imaging sensor 12. The lens drive unit 13 can switch the angle of view to the wide-angle side by moving the zoom lens closer to the imaging sensor 12 and switch the angle of view to the narrow-angle side by moving the zoom lens away from the imaging sensor 12. That is, the lens drive unit 13 adjusts the focal length of the imaging sensor 12.

A CMOS (Complementary Metal Oxide Semiconductor) image sensor or a CCD (Charge Coupled Devices) image sensor can be used as the imaging sensor 12. The imaging sensor 12 converts the light incident via the lens unit 30 into an electrical video signal. The imaging sensor 12 captures a movie having a frame rate of 30 Hz or 60 Hz and outputs the movie to the control unit 11.

Figure 3:
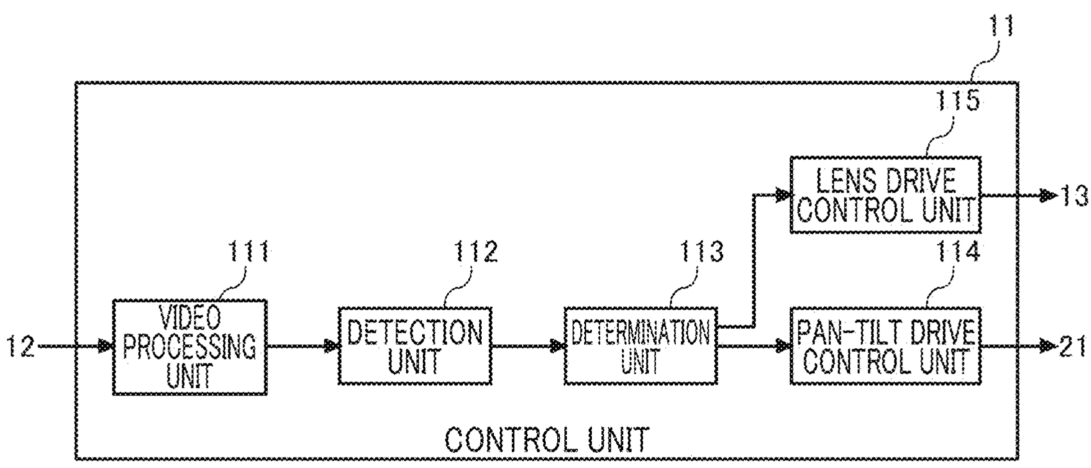
FIG. 3 shows an exemplary configuration of the control unit of the imaging unit according to embodiment 1.

FIG. 3 shows an exemplary configuration of the control unit 11 of the imaging unit 10 according to embodiment 1. The control unit 11 includes a video processing unit 111, a detection unit 112, a determination unit 113, a pan-tilt drive control unit 114, and a lens drive control unit 115. These components can be realized by the cooperation of hardware resources and software resources or by hardware resources alone. Hardware resources that can be used include CPU, ROM, RAM, GPU (Graphics Processing Unit), DSP (Digital Signal Processor), ISP (Image Signal Processor), ASIC (Application Specific Integrated Circuit), Field-Programmable Gate Array (FPGA), and other LSIs. Programs such as firmware can be used as software resources.

The video processing unit 111 executes various video processes such as gradation correction and contour correction on the video signal input from the imaging sensor 12 and outputs the processed signal.

The detection unit 112 includes a detector for detecting the animal to be observed. The detector is generated for, for example, the whole body, face, or facial part (left eye, right eye, mouth, left ear, right ear, etc.), respectively, of the animal to be observed and is maintained as dictionary data. Each detector is generated by learning the feature amount of the animal's whole body, face, and facial part included in a large number of images showing the animal to be observed. The whole body, face, and facial part of the animal in the image are framed by an annotation tool before training. For example, HOG (Histograms of Oriented Gradients), Haar-like, LBP (Local Binary Patterns), etc. can be used as the feature amount.

The detection unit 112 conducts a search in each frame image of the input video by using each detector. When the detection unit 112 detects the animal to be observed in the frame image, the detection unit 112 tracks the detected animal in the subsequent frame images. To track the animal, a particle filter or a mean-shift method can, for example, be used. The detection unit 112 can detect the motion vector of the animal in the process of tracking the detected animal. When there are a plurality of animals to be observed in the frame image, the detection unit 112 selects the animal with the shortest distance from the imaging unit 10 as the subject. The detection unit 112 can detect which direction the animal's face is facing by referring to the positional relationship between the animal's facial parts.

Figure 4:
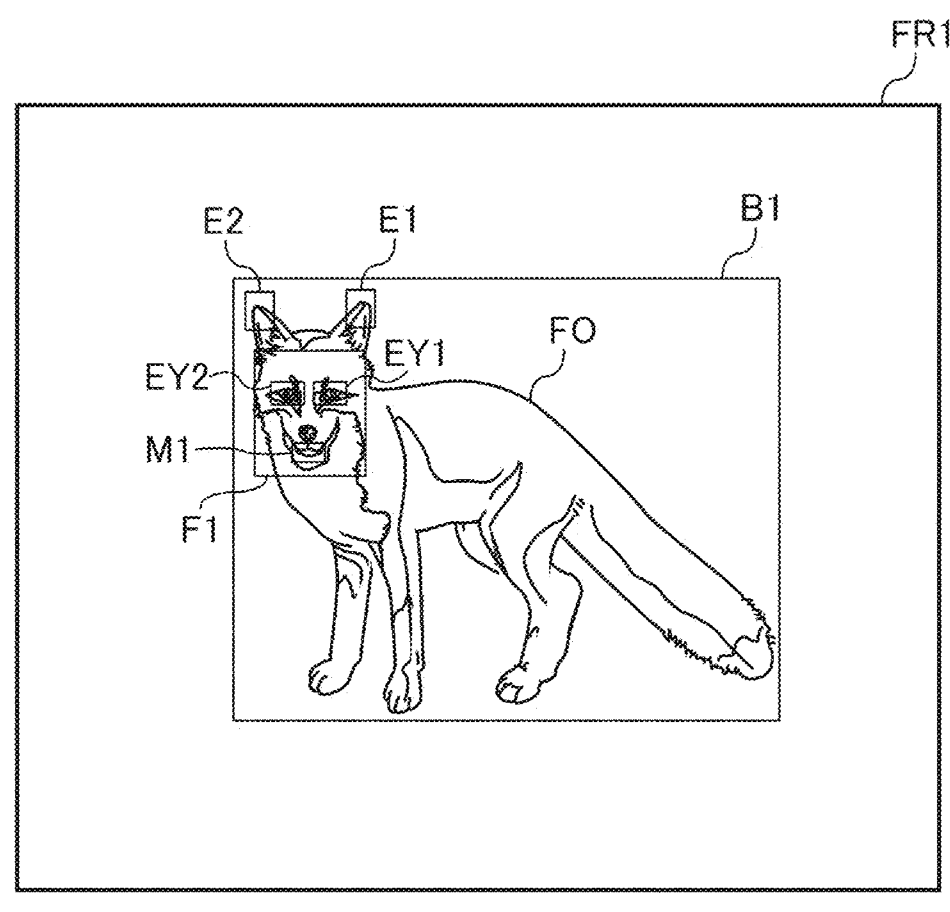
FIG. 4 illustrates a specific example of the process of detecting the face orientation of the animal.

FIG. 4 illustrates a specific example of the process of detecting the face orientation of the animal. In the frame image FR1, the whole body B1 and the face F1 of a fox FO are detected. Further, the left eye EY1, the right eye EY2, the mouth M1, the left ear E1, and the right ear E2 are detected as facial parts. The detection unit 112 determines the face orientation of the animal with respect to the imaging unit 10 based on an inverted triangle having the left eye EY1, the right eye EY2, and the mouth M1 as the vertices. When the inverted triangle is a shape that can be regarded as symmetrical, for example, the detection unit 112 determines that the animal is facing the front with respect to the imaging unit 10.

Reference is made back to FIG. 3. The determination unit 113 determines whether the animal detected by the detection unit 112 is alert to the imaging apparatus 1. The pan-tilt drive control unit 114 controls the pan-tilt drive unit 21 to execute a pan operation or a tilt operation in accordance with the movement of the animal detected by the detection unit 112. Hereinafter, the pan-tilt drive control unit 114 may be referred to as the drive control unit.

When an animal being tracked enters the end area set in the frame image, and when the animal is moving in a direction away from the angle of view, the pan-tilt drive control unit 114 supplies a control signal to the pan-tilt drive unit 21 to cause the pan-tilt table 20 to rotate horizontally or vertically at a speed corresponding to the moving speed of the animal. When an animal being tracked enters the rightmost region set in the frame image, and when the animal is moving in the right direction in the angle of view, for example, the pan-tilt drive control unit 114 supplies a control signal to the pan-tilt drive unit 21 to cause the pan-tilt table 20 to rotate in the right direction at a speed corresponding to the moving speed of the animal.

When the animal being tracked is located in the central region set in the frame image, or when the animal being tracked enters but the animal is not moving in a direction away from the angle of view, the pan-tilt drive control unit 114 does not activate pan-tilt control.

When the determination unit 113 determines that the animal being tracked is alert to the imaging apparatus 1 while pan-tilt control is being executed, the pan-tilt drive control unit 114 supplies a control signal to stop the pan operation or the tilt operation to the pan-tilt drive unit 21.

In the basic state, the lens drive control unit 115 controls the lens drive unit 13 to control the zoom lens to the narrow-angle side so that the subject animal is shown in a large size. When the determination unit 113 determines that the animal being tracked is alert to the imaging apparatus 1, the lens drive control unit 115 supplies a control signal to cause the lens drive unit 13 to switch the zoom lens to the wide-angle side.

Figure 5:
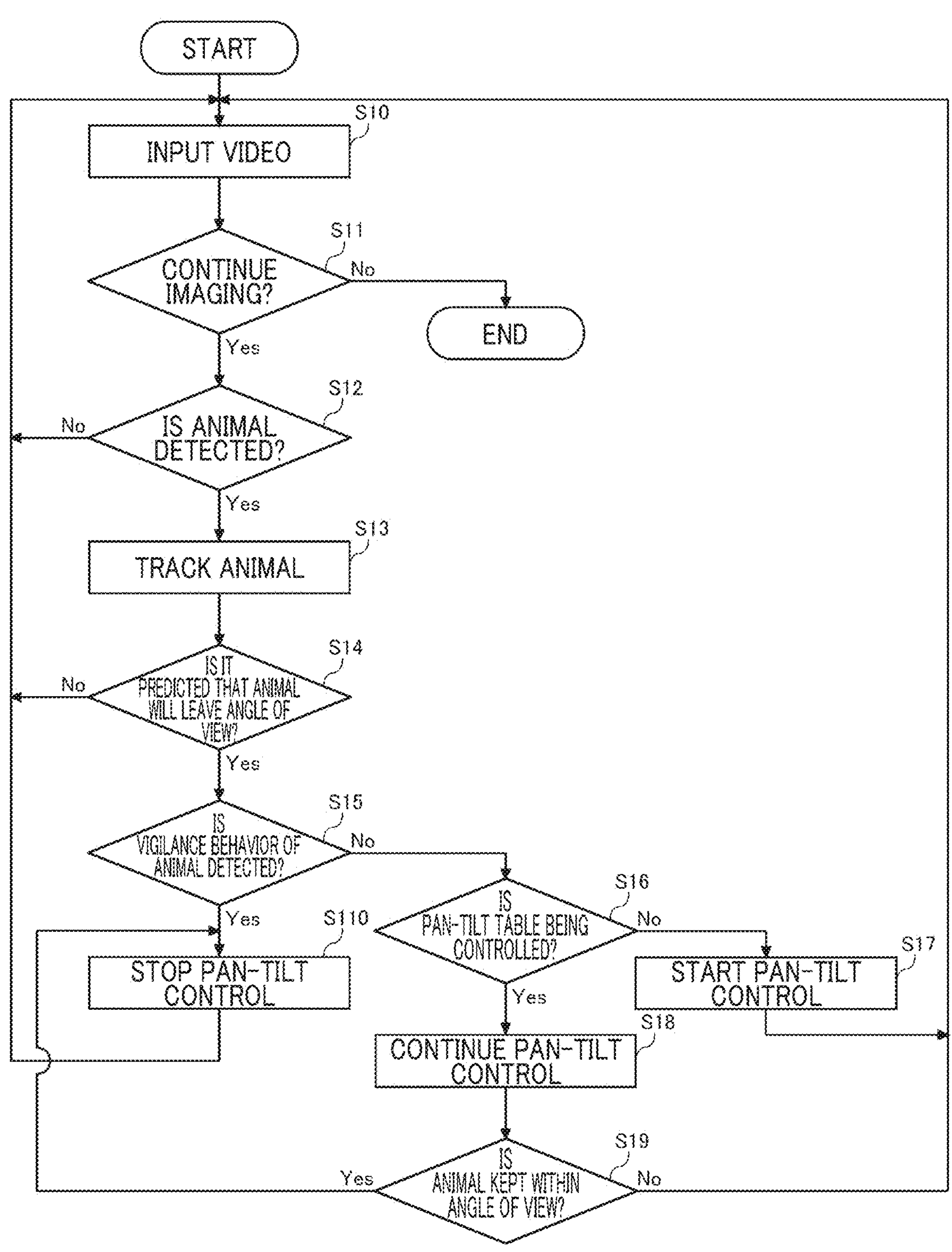
FIG. 5 is a flowchart illustrating exemplary operation 1 of the imaging apparatus according to embodiment 1.

FIG. 5 is a flowchart illustrating exemplary operation 1 of the imaging apparatus 1 according to embodiment 1. The video captured by the imaging sensor 12 is input to the control unit 11 (step S10). The video processing unit 111 of the control unit 11 executes a predetermined video process on the input video. When imaging is continued (Yes in step S11), the process proceeds to step S12. When imaging is terminated (No in step S11), the entire process is terminated.

The detection unit 112 searches for the animal to be observed in the frame image by using the detector (step S12). When the animal to be observed cannot be detected (No in step S12), the process proceeds to step S10. When the animal to be observed can be detected (Yes in step S12), the detection unit 112 tracks the animal to be observed (step S13).

The determination unit 113 predicts whether the animal being tracked will leave the angle of view (step S14). The angle of view is an angle indicating the imaging range of the imaging unit 10. When the animal being tracked moving from a given position in the angle of view in the direction toward the screen edge reaches a certain distance or less from the screen edge, for example, the determination unit 113 predicts that the animal being tracked will leave the angle of view. For example, the determination unit 113 predicts that the animal being tracked will not leave the angle of view when the animal being tracked has stopped moving. Step S14 may be omitted, in which case step S15 is executed after the process of step S13.

When it is predicted that the animal will not leave the angle of view (No in step S14), the process proceeds to step S10. When it is predicted that the animal will leave the angle of view (Yes in step S14), the determination unit 113 determines whether the animal being tracked exhibits a vigilance behavior (step S15).

In this specification, a vigilance behavior of an animal is defined as a behavior that meets at least one of the following (1)-(4). (1) When the movement of an animal that had been moving to leave the angle of view stops. When the animal notices the presence of the imaging apparatus 1, it may stop suddenly. (2) When the animal's face faces the direction of the imaging apparatus 1 (when the animal faces the front with respect to the imaging unit 10). The action of facing the direction of the imaging apparatus 1 generating sound can certainly be said to be a vigilance behavior of the animal. (3) When both ears of the animal are erect. The action of the animal to erect its ears is known as an action indicating vigilance. The action of the animal to erect its ears can be detected by preparing a detector to detect the erect left ear and a detector to detect the erect right ear. (4) When the head of the animal lowered to the level of the ground is suddenly lifted. The action of the animal that had lowered its head to eat grass, etc. on the ground suddenly lifting its head can be said to be a vigilance behavior.

When a vigilance behavior of the animal being tracked is not detected (No in step S15), the process proceeds to step S16. When the pan-tilt drive control unit 114 is not controlling the pan-tilt table 20 (No in step S16), the pan-tilt drive control unit 114 starts pan-tilt control to keep the animal being tracked within the angle of view as much as possible (step S17). The process then proceeds to step S10. When the pan-tilt drive control unit 114 is controlling the pan-tilt table 20 (Yes in step S16), the pan-tilt drive control unit 114 continues the pan-tilt control (step S18).

The determination unit 113 determines whether the animal being tracked is kept within the angle of view in a stable manner (step S19). When the animal being tracked is located in the central region of the angle of view or when the animal being tracked has stopped moving, for example, the determination unit 113 determines that the animal being tracked is kept within the angle of view in a stable manner.

When the animal being tracked is not within the angle of view in a stable manner (No in step S19), the process proceeds to step S10. When the animal being tracked is kept within the angle of view in a stable manner (Yes in step S19), the pan-tilt drive control unit 114 stops the pan-tilt control (step S110). The process then proceeds to step S10. When the vigilance behavior of the animal being tracked is detected in step S15 (Yes in step S15), the pan-tilt drive control unit 114 also stops the pan-tilt control (step S110). The process then proceeds to step S10. That is, the pan-tilt drive control unit 114 does not execute pan-tilt control while it is determined that the animal being tracked is alert to the imaging apparatus 1. Pan-tilt control is executed after it is determined that the animal being tracked is no longer alert to the imaging apparatus 1.

Figure 6:
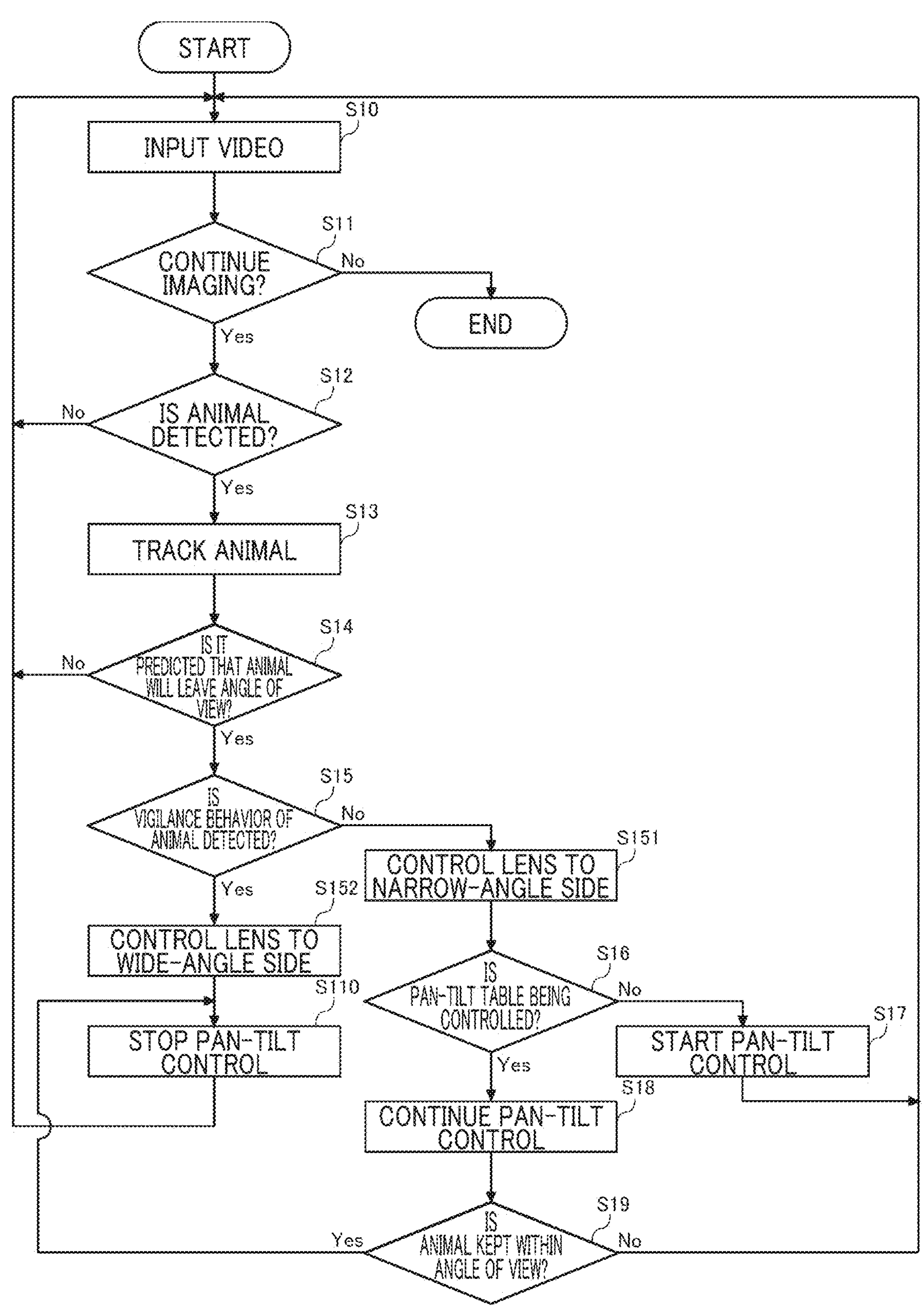
FIG. 6 is a flowchart illustrating exemplary operation 2 of the imaging apparatus according to embodiment 1.

FIG. 6 is a flowchart illustrating exemplary operation 2 of the imaging apparatus 1 according to embodiment 1. The flowchart according to exemplary operation 2 of embodiment 1 is derived from adding the processes of step S151, step S152 to the flowchart according to exemplary operation 1 of embodiment 1 shown in FIG. 5. Hereinafter, the difference from the flowchart according to exemplary operation 1 of embodiment 1 shown in FIG. 5 will be described.

When the vigilance behavior of the animal being tracked is not detected in step S15 (No in step S15), the lens drive control unit 115 controls the zoom lens to the narrow-angle side so that the animal is shown in a large size. (S151). When the vigilance behavior of the animal during tracking is detected (Yes in step S15), the lens drive control unit 115 controls the zoom lens to the wide-angle side so that the animal is kept within the angle of view even if the pan-tilt control is stopped (S152).

That is, the imaging unit 10 zooms into the animal being tracked to image the animal in as large a size as possible during a pan-tilt operation because the orientation of the imaging unit 10 is controlled to track the movement of the animal. Meanwhile, the imaging unit 10 zooms out and images the animal in a wide angle while the pan-tilt operation is stopped because the orientation of the imaging unit 10 is not controlled to track the movement of the animal. The other processes are the same as those of the flowchart shown in FIG. 5.

As described above, according to embodiment 1, it is possible to shoot a video of the animal's ecology without alarming the animal as much as possible by immediately stopping the pan-tilt operation when the animal is alarmed. Further, animal tracking and ecological observation can be continued by switching the zoom lens to the wide angle until the animal no longer exhibits a vigilance behavior.

Embodiment 2

Figure 7:
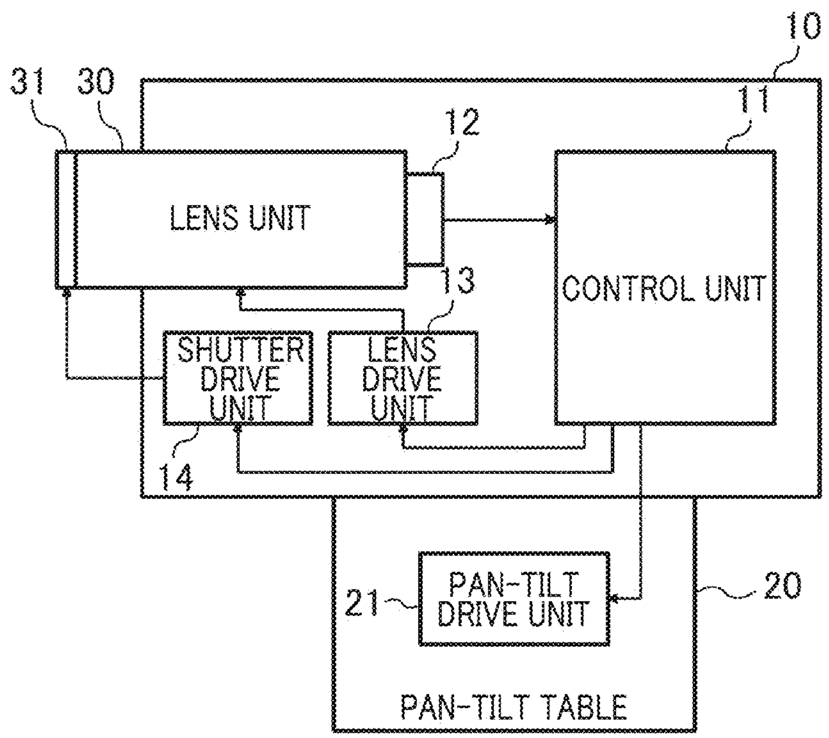
FIG. 7 shows a specific configuration of the imaging unit and the pan-tilt table according to embodiment 2.

FIG. 7 shows a specific configuration of the imaging unit 10 and the pan-tilt table 20 according to embodiment 2. Hereinafter, the difference from the imaging unit 10 according to embodiment 1 will be described. In embodiment 2, a far-infrared camera is used as the imaging unit 10. A far-infrared camera is a camera that can capture infrared rays emitted by a subject without irradiating the subject with infrared rays. The imaging unit 10 according to the embodiment 2 further includes a shutter drive unit 14.

For example, a microbolometer is used as the imaging sensor 12 of the far-infrared camera. A microbolometer is an uncooled thermal sensing element and encompasses an FPA (Focal Plane Array) in which a plurality of bolometers are arranged in a two-dimensional grid (e.g., 640×480, 1024×768). The bolometer that constitutes each pixel has an absorbing layer made of amorphous silicon or vanadium oxide. When far-infrared rays enter the absorbing layer, the temperature of the absorbing layer changes so that the resistance value of the absorbing layer changes. By applying a predetermined voltage between electrodes at two locations in the absorbing layer, the change in the resistance value of the absorbing layer is detected as a change in the current value. The current value of each bolometer is converted into a voltage and is output as a luminance signal for each pixel. The imaging sensor 12 outputs an infrared thermal image composed of luminance signals of a plurality of pixels arranged in a two-dimensional grid to the control unit 11.

A temperature sensor (e.g., a thermistor) is provided in the vicinity of the microbolometer, and the temperature in the vicinity of the microbolometer measured by the temperature sensor is output to the control unit 11, although the feature is not shown.

In embodiment 2, a shutter 31 is provided on the optical path of the infrared rays focused on the imaging sensor 12. In FIG. 7, the shutter 31 is provided at the end of the lens unit 30, but the shutter 31 may be provided at any position on the optical path of infrared rays focused on the imaging sensor 12. The shutter 31 may be provided in the lens unit 30 or may be provided between the lens unit 30 and the imaging sensor 12. The shutter drive unit 14 drives the shutter 31 to open or close shutter 31 based on a control signal supplied from the control unit 11. The shutter 31 is a mechanical shutter, and a relatively loud operating noise is generated when the shutter 31 is opened or closed.

Figure 8:
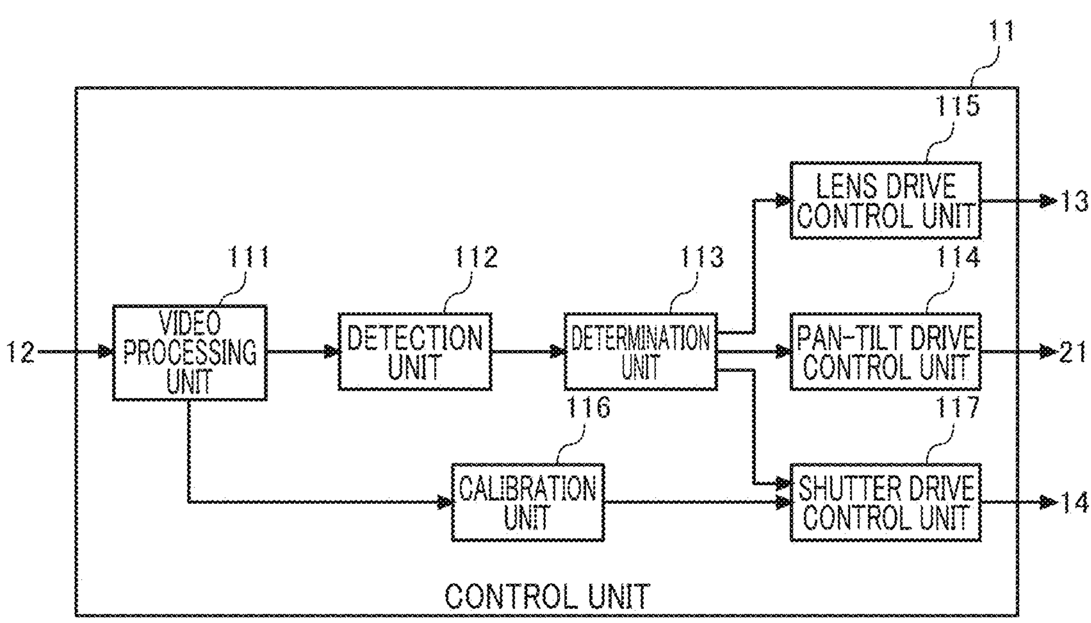
FIG. 8 shows an exemplary configuration of the control unit of the imaging unit according to embodiment 2.

FIG. 8 shows an exemplary configuration of the control unit 11 of the imaging unit 10 according to embodiment 2. In embodiment 2, a calibration unit 116 and a shutter drive control unit 117 are added to the configuration of the control unit 11 shown in embodiment 1. Hereinafter, the shutter drive control unit 117 may be referred to as the drive control unit.

The calibration unit 116 calibrates the variation of the offset of the signal output by each bolometer constituting each pixel. The back side of the shutter 31 is a uniform temperature surface. That is, the back surface of the shutter 31 can be imaged as a uniform temperature surface even when the ambient temperature changes. The calibration unit 116 creates a correction table for correction of pixel-to-pixel variation by causing the imaging sensor 12 to image the back surface of the shutter 31 while the shutter 31 is being closed. Generally, it is necessary to close the shutter 31 for a little shorter than 1 second to acquire correction data for calibration of the imaging sensor 12. The calibration unit 116 refers to the correction table to adjust the offset of each pixel of the input image and correct the image to a flat image.

The shutter drive control unit 117 causes the shutter drive unit 14 to close the shutter 31 for execution of calibration of the imaging sensor 12 according to a predetermined calibration execution condition. The output characteristics of the bolometer constituting the imaging sensor 12 change from time to time due to environmental factors such as temperature. In this embodiment, execution of calibration is trigged by at least one of the conditions including: an elapse of a certain time (e.g., 2 minutes) since the execution of the previous calibration; and a temperature change above a certain level (e.g., 0.5°) from the temperature of the imaging sensor 12 at the time of the previous calibration.

When the determination unit 113 determines that the animal being tracked is alert to the imaging apparatus 1, the shutter drive control unit 117 supplies a control signal to cause the shutter drive unit 14 to suspend the operation to open or close the shutter 31 for execution of calibration of the imaging sensor 12. That is, execution of shutter calibration of the imaging sensor 12 is suspended while it is determined that the animal being tracked is alert to the imaging apparatus 1.

Figure 9:
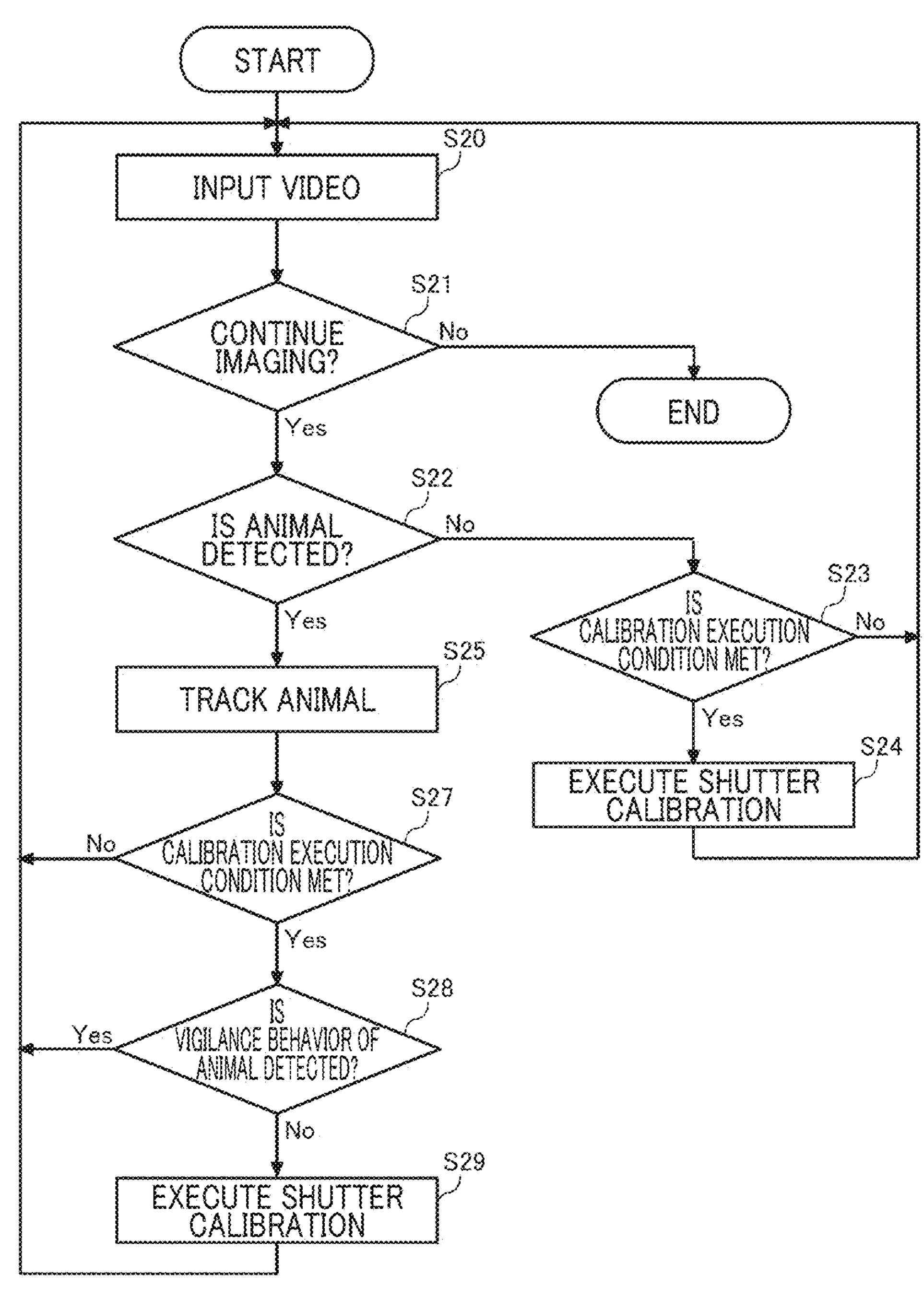
FIG. 9 is a flowchart illustrating exemplary operation 1 of the imaging apparatus according to embodiment 2.

FIG. 9 is a flowchart illustrating exemplary operation 1 of the imaging apparatus 1 according to embodiment 2. The infrared video captured by the imaging sensor 12 is input to the control unit 11 (step S20). The video processing unit 111 of the control unit 11 executes a predetermined image process on the input infrared image. When imaging is continued (Yes in step S21), the process proceeds to step S22. When imaging is terminated (No in step S21), the entire process is terminated.

The detection unit 112 searches the frame image for an animal to be observed by using a detector (step S22). When it is not possible to detect the animal to be observed (No in step S22), the calibration unit 116 determines whether the predetermined calibration execution condition is met (step S23). When the predetermined calibration execution condition is not met (No in step S23), the process proceeds to step S20. When the predetermined calibration execution condition is met (Yes in step S23), the calibration unit 116 instructs the shutter drive control unit 117 to close the shutter 31 and execute shutter calibration (step S24). I will be noted that the video processing unit 111 does not need to output the video shot during shutter calibration to the detection unit 112. This is because the shutter 31 is closed during shutter calibration, and so the animal cannot be detected in the video. After shutter calibration is executed, the calibration unit 116 instructs the shutter drive control unit 117 to open the shutter 31 and proceeds to step S20.

When the animal to be observed is detected in step S22 (Yes in step S22), the detection unit 112 tracks the animal to be observed (step S25). The calibration unit 116 determines whether the predetermined calibration execution condition is met (step S27). When the predetermined calibration execution condition is not met (No in step S27), the process proceeds to step S20.

When the predetermined calibration execution condition is met (Yes in step S27), the determination unit 113 determines whether the animal being tracked has exhibited a vigilance behavior (step S28). When the vigilance behavior of the animal being tracked is detected (Yes in step S28), the process proceeds to step S20. When the vigilance behavior of the animal being tracked is not detected (No in step S28), the calibration unit 116 instructs the shutter drive control unit 117 to close the shutter 31 and execute shutter calibration (step S29). After shutter calibration is executed, the calibration unit 116 instructs the shutter drive control unit 117 to open the shutter 31 and proceeds to step S20.

When the calibration execution condition requires that a certain time has elapsed since the execution of the previous calibration, the time of execution of previous calibration is updated to the current time in step S29. Further, in the flow passing through Yes in step S28, the time of execution of previous calibration does not need to be updated because the execution of shutter calibration is suspended. That is, in step S27 executed after the determination by the determination unit 113 that the animal being tracked has exhibited a vigilance behavior (Yes in step S28), the execution condition will be met for the shutter drive control unit 117 because a certain time or longer has elapsed since the execution of previous calibration (Yes in step S27). Thus, when the determination unit 113 determines that the predetermined calibration execution condition is met (Yes in step S27), and when the determination unit 113 determines the animal being tracked is not exhibiting a vigilance behavior (No in step S28), therefore, the shutter drive control unit 117 cancels the suspension of shutter calibration and executes shutter calibration (step S29).

Figure 10:
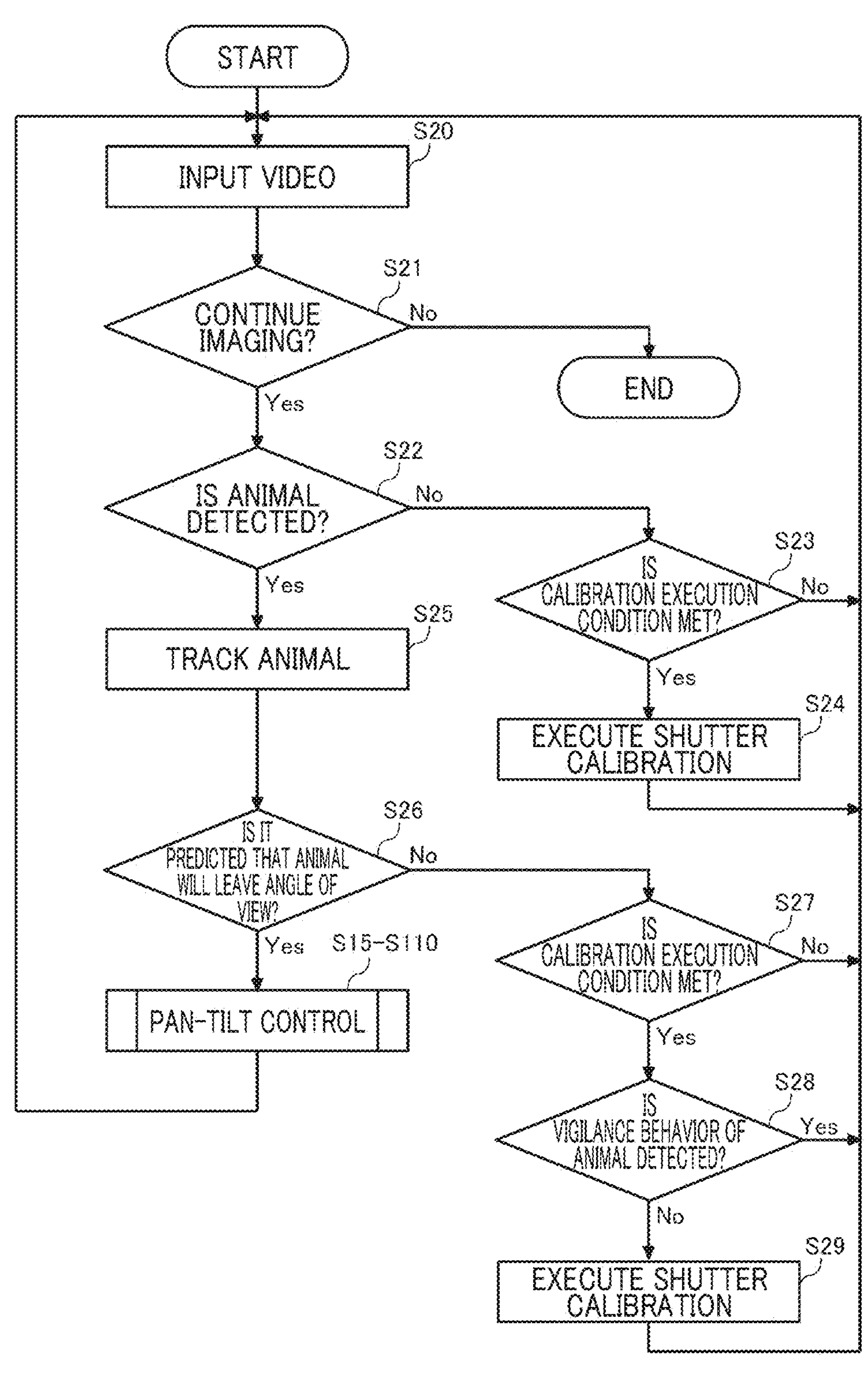
FIG. 10 is a flowchart illustrating exemplary operation 2 of the imaging apparatus according to embodiment 2.

FIG. 10 is a flowchart illustrating exemplary operation 2 of the imaging apparatus 1 according to embodiment 2. The processes of steps S20-steps S25 are the same as those of the flowchart according to exemplary operation 1 of embodiment 2 shown in FIG. 9.

The determination unit 113 predicts whether the animal being tracked will leave the angle of view (step S26). When it is predicted that the animal will not leave the angle of view (No in step S26), the processes of steps S27-steps S29 of the flowchart shown in FIG. 9 are executed. After the processes are executed, the process proceeds to step S20. When it is predicted that the animal being tracked will leave the angle of view (Yes in step S26), the processes of steps S15-steps S110 of the flowchart shown in FIG. 5 are executed. After the processes are executed, the process proceeds to step S20.

In second exemplary operation shown in FIG. 10, an example is shown where shutter calibration is suspended both when the animal being tracked exhibits a vigilance behavior and when a pan-tilt operation is being executed. Alternatively, in the case of a model in which the accuracy of shutter calibration is ensured even while the imaging unit 10 is moving, shutter calibration may be executed even during a pan-tilt operation so long as the animal being tracked is not exhibiting a vigilance behavior.

Figure 11:
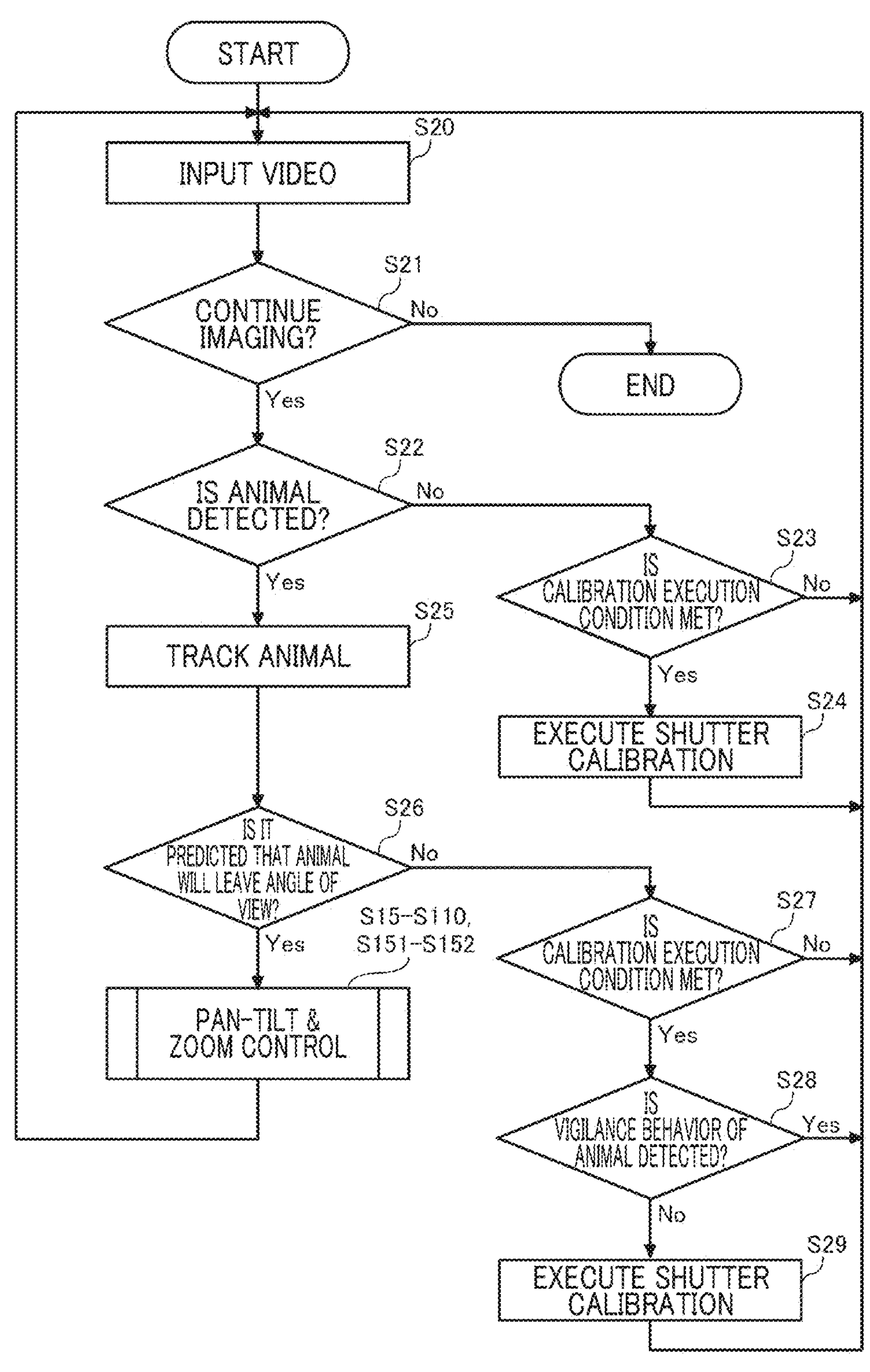
FIG. 11 is a flowchart illustrating exemplary operation 3 of the imaging apparatus according to embodiment 2.

FIG. 11 is a flowchart illustrating exemplary operation 3 of the imaging apparatus 1 according to embodiment 2. The flowchart according to exemplary operation 3 of embodiment 3 is such that the processes executed in step S26 of the flowchart according to exemplary operation 2 of embodiment 2 shown in FIG. 10 when it is predicted that the animal being tracked will leave the angle of view (Yes in step S26) are replaced by the processes of steps S15-step S110, step S151, step S152 of the flowchart shown in FIG. 6. That is, the process of imaging in a narrow angle during a pan-tilt operation and imaging in a wide angle while a pan-tilt operation is stopped is added.

As described above, according to embodiment 2, it is possible to shoot a video of the animal's ecology without alarming the animal as much as possible by suspending shutter calibration when the animal is alarmed. It is possible to continue an ecological observation of the animal without alarming the animal by executing shutter calibration when the animal is not in the angle of view or when the animal is in the angle of view but does not exhibit a vigilance behavior any longer. It is also possible to prevent frame dropping of the video in the section in which the animal exhibiting a vigilance behavior is shown and to ensure the quality of the video of ecological observation.

Described above is an explanation based on exemplary embodiments. The embodiment is intended to be illustrative only and it will be understood by those skilled in the art that various modifications to combinations of constituting elements and processes are possible and that such modifications are also within the scope of the present invention.

In the above-described embodiment, an example of using the pan-tilt table 20 capable of both a pan operation and a tilt operation has been described. Alternatively, a pan table capable of only a pan operation or a tilt table capable of only a tilt operation may be used instead of the pan-tilt table 20. In the case the animal to be observed is kept in a cage and the field of activity of the animal is restricted, for example, only one of the pan table or the tilt table may be used.

Still alternatively, the imaging apparatus 1 according to the embodiment may be implemented by a PTZ camera without the tripod 40 and attached to the ceiling, wall, pole, etc. A PTZ camera is a camera equipped with a PTZ (Pan-Tilt-Zoom) mechanism that changes the orientation of the camera and the zoom factor of the camera.

In embodiment 2, the pan-tilt table 20 may be omitted. That is, an infrared camera having a fixed angle of view may be used in the imaging unit 10 according to embodiment 2. In embodiment 2, a near-infrared camera may be used when an animal that does not respond to infrared irradiation is to be observed.

What is claimed is:

1. An imaging apparatus comprising:

an imaging unit;

a detection unit that detects an animal in a video shot by the imaging unit;

a determination unit that determines whether the animal detected by the detection unit is alerted to the imaging apparatus;

a pan-tilt drive unit that executes at least one of a pan operation or a tilt operation of the imaging unit; and a drive control unit that controls the pan-tilt drive unit, wherein, when the determination unit determines that the animal is alerted to the imaging apparatus while the pan-tilt drive unit is executing the pan operation or the tilt operation in accordance with a movement of the animal, the drive control unit suspends the pan operation or the tilt operation executed by the pan-tilt drive unit.

2. The imaging apparatus according to claim 1, further comprising:

a lens drive unit that drives a zoom lens that adjusts a focal length of an imaging sensor provided in the imaging unit, wherein the drive control unit causes the lens drive unit to control the zoom lens to a wide-angle side when the determination unit determines that the animal is alerted to the imaging apparatus.

3. An imaging apparatus comprising:

an imaging unit;

a detection unit that detects an animal in a video shot by the imaging unit;

a determination unit that determines whether the animal detected by the detection unit is alerted to the imaging apparatus;

a shutter drive unit that drives a shutter to open or close the shutter; and a drive control unit that controls the shutter drive unit, wherein the drive control unit suspends calibration, executed by the shutter drive unit, of the imaging sensor provided in the imaging unit that accompanies opening or closing of the shutter, when the determination unit determines that the animal is alerted to the imaging apparatus.

4. The imaging apparatus according to claim 3, wherein the drive control unit executes calibration when a predetermined condition for execution of calibration is met and when the determination unit determines that the animal is not alerted to the imaging apparatus.

5. An imaging apparatus comprising:

an imaging unit;

a detection unit that detects an animal in a video shot by the imaging unit; and a determination unit that determines whether the animal detected by the detection unit is alerted to the imaging apparatus, wherein the determination unit causes an operation that generates an operating sound to be suspended when the determination unit determines that the animal is alerted to the imaging apparatus, wherein the detection unit detects a whole or a part of an animal in a video shot by the imaging unit, and wherein the determination unit determines that the animal is alerted to the imaging apparatus when at least one of the following is detected: i) the animal stops moving; ii) when the animal faces a direction of the imaging apparatus; iii) when ears of the animal are erect; or iv) when a head of the animal is lifted.

* * * * *